US 12,237,612 B2

United States Patent
Moncher et al.

(10) Patent No.: US 12,237,612 B2
(45) Date of Patent: Feb. 25, 2025

(54) ELECTRICAL PLUG WITH FRICTION BRAKE DEVICE, AS WELL AS ARRANGEMENT AND METHOD

(71) Applicant: TE Connectivity Industrial GmbH, Neiderwinkling (DE)

(72) Inventors: Philipp Moncher, Niederwinkling (DE); Sebastian Achatz, Niederwinkling (DE); Florian Hartl, Niederwinkling (DE)

(73) Assignee: TE Connectivity Industrial GmbH, Niederwinkling (DE)

( * ) Notice: Subject to any disclaimer, the term of this patent is extended or adjusted under 35 U.S.C. 154(b) by 273 days.

(21) Appl. No.: 17/510,775

(22) Filed: Oct. 26, 2021

(65) Prior Publication Data

US 2022/0131307 A1 Apr. 28, 2022

(30) Foreign Application Priority Data

Oct. 27, 2020 (EP) .................................... 20204127

(51) Int. Cl.
*H01R 13/506* (2006.01)
*H01R 13/502* (2006.01)

(52) U.S. Cl.
CPC ......... *H01R 13/506* (2013.01); *H01R 13/502* (2013.01)

(58) Field of Classification Search
CPC .......... H01R 13/506; H01R 4/48; H01R 4/64; H01R 13/74; H01R 13/502; H01R 43/00; H02G 3/0616; H02G 3/22
See application file for complete search history.

(56) References Cited

U.S. PATENT DOCUMENTS

| 4,165,910 | A | 8/1979 | Anderson |
| 6,957,972 | B2 * | 10/2005 | Starke ................. H01R 13/625 439/216 |
| 7,331,807 | B2 * | 2/2008 | Scholler .............. H01R 13/622 439/320 |
| 7,413,457 | B2 | 8/2008 | Mehnert et al. |
| 11,177,616 | B2 | 11/2021 | Edenhofer et al. |
| 11,239,610 | B2 | 2/2022 | Herbert et al. |

(Continued)

FOREIGN PATENT DOCUMENTS

| CN | 1972024 A | 5/2007 |
| CN | 101859961 A | 10/2010 |
| CN | 102280759 A | 12/2011 |

(Continued)

OTHER PUBLICATIONS

Extended European Search Report, Application No. 20204127.3, dated Feb. 26, 2021, 7 pages.

(Continued)

*Primary Examiner* — Briggitte R. Hammond
(74) *Attorney, Agent, or Firm* — Barley Snyder (57) ABSTRACT

An electrical plug includes a plug housing having a first plug housing section with a longitudinal axis and a friction brake device including a friction brake part arranged on an outer face of the first plug housing section. The friction brake part is exposed towards an outside in a radial direction to the longitudinal axis. The friction brake device provides a friction braking azimuthally around the longitudinal axis below a set torque threshold value for the electrical plug.

16 Claims, 11 Drawing Sheets

(56) References Cited

U.S. PATENT DOCUMENTS

2005/0037664 A1    2/2005  Weidner
2009/0170364 A1*  7/2009  Scholler ............... H01R 13/622
                                                                                     439/359

FOREIGN PATENT DOCUMENTS

| CN | 109560424 A | 4/2019 | | |
|---|---|---|---|---|
| CN | 110383603 A | 10/2019 | | |
| CN | 110770982 A | 2/2020 | | |
| DE | 202013104759 U1 | 11/2013 | | |
| DE | 202015102170 U1 | 5/2015 | | |
| DE | 202013012278 U1 | 1/2016 | | |
| EP | 1465293 A2 | 10/2004 | | |
| EP | 3089284 A1 | 11/2016 | | |
| WO | WO-2019219118 | * | 11/2019 | ........... H01R 13/506 |

OTHER PUBLICATIONS

Chinese First Office Action dated Nov. 24, 2023 with English translation, corresponding to Application No. 202111239166.5, 24 pages.

* cited by examiner

ELECTRICAL PLUG WITH FRICTION BRAKE DEVICE, AS WELL AS ARRANGEMENT AND METHOD

CROSS-REFERENCE TO RELATED APPLICATIONS

This application claims the benefit of the filing date under 35 U.S.C. § 119(a)-(d) of European Patent Application No. 20204127.3, filed on Oct. 27, 2020.

FIELD OF THE INVENTION

The present invention relates to an electrical plug and, more particularly, to an electrical plug for connecting to a housing part of an electric motor.

BACKGROUND

Electrical plugs are known in varied designs and for different application areas. Plugs are known which can be connected to a housing of an electric motor. Electrical angle plugs are also known, for example from European Patent No. 3 089 284 A1. This electrical angle plug comprises a plug housing with a first plug housing section. The first plug housing section is axially inserted into a flange sleeve associated with the electrical angle plug. For retaining the plug housing on the flange sleeve, several components are provided. An axial holding device retains the plug housing in the direction of the longitudinal axis of the first plug housing section in the flange sleeve. For avoiding a rotational movement between the first plug housing and the flange sleeve, a gear tooth system is provided. A rotational movement of the plug housing relative to the then coupled flange sleeve is intentionally prevented.

The electrical angle plug used with the flange sleeve is provided so that the flange sleeve can be fastened fixed in place on an outer face of a housing part of a housing of an electric motor. In this regard, a screw connection is provided. The flange sleeve and thus also the complete electrical plug are prevented from rotating relative to the housing part.

In the case of modern applications, an increased flexibility of the use of electrical plugs is desired. In particular, the handling and the accessibility of such electrical plugs in the mounted state on a housing of the electric motor is to be designed more variably.

SUMMARY

An electrical plug includes a plug housing having a first plug housing section with a longitudinal axis and a friction brake device including a friction brake part arranged on an outer face of the first plug housing section. The friction brake part is exposed towards an outside in a radial direction to the longitudinal axis. The friction brake device provides a friction braking azimuthally around the longitudinal axis below a set torque threshold value for the electrical plug.

BRIEF DESCRIPTION OF THE DRAWINGS

The invention will now be described by way of example with reference to the accompanying Figures, of which.

DETAILED DESCRIPTION OF THE EMBODIMENT(S)

Features of the invention will now be described with respect to the figures. The features and feature combinations mentioned in the description as well as the features and feature combinations shown in the figures alone are usable not only in the respectively specified combination, but also in other combinations or taken alone without departing from the scope of the invention. Thus, implementations are also to be considered as encompassed and disclosed by the invention, which are not explicitly shown in the figures and explained, but arise from and can be generated from the explained implementations. Implementations and feature combinations are also to be considered as disclosed that do not comprise all of the features of an originally formulated independent claim. Moreover, implementations and feature combinations are to be considered as disclosed that extend beyond or deviate from the feature combinations set out in the claims. In the figures, the same elements or elements having the same function are equipped with the same reference signs.

With the indications "top," "bottom," "front," "rear," "horizontal," "vertical," "depth direction," "width direction," "height direction," the positions and orientations given in the case of intended use and intended arrangement of the plug are indicated, but the disclosure is not limited to these particular positions and orientations.

Figure 1:
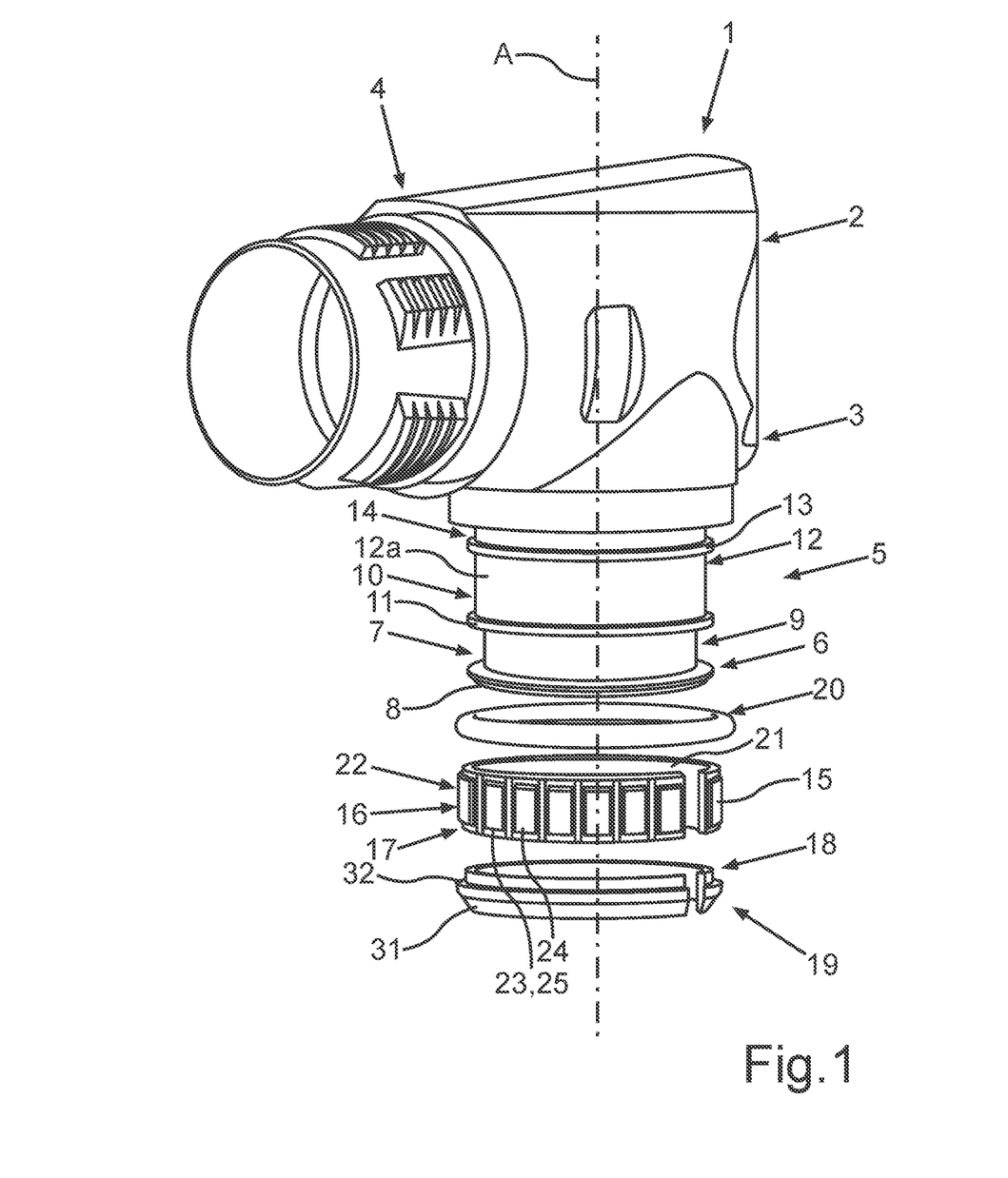
FIG. 1 is an exploded perspective view of an electrical plug according to an embodiment.

In FIG. 1 in an exploded view an embodiment of an electrical plug 1 is shown. The electrical plug in the embodiment is an angle plug. The electrical plug 1 comprises a plug housing 2. This is configured in an embodiment as a single piece. It is made from die casting of a metal material. In an embodiment it is made from zinc die casting. The plug housing 2 has a first tube-like plug housing section 3 with a longitudinal axis A. Moreover, the plug housing 2 has a second, tube-like plug housing section 4, which is arranged at an angle, in particular 90°, relative to the first housing section 3. The positioning of the electrical plug 1 on the housing 2 of an electric motor is facilitated to be more variable and still a reliable retaining is achieved.

The first plug housing section 3 intentionally is configured for direct coupling, for instance, to a housing part of a housing of an electric motor. This housing part of the housing is also designated as bearing shield. The first plug housing section 3 has an insertion portion 5, which is provided for direct inserting into a plug socket of the housing part. The insertion portion 5 has a free end 6. This free end 6 is the one which, upon insertion into the plug socket, is first to plunge in this hole portion. At the first end 6, a collar 7 is formed. This collar 7 is a radial bar, which means that it forms a bulge perpendicular to the longitudinal axis A. This collar 7 has a conical outer face 8. Thus, the inserting into the plug socket can be effected more simply.

As shown in FIG. 1, the collar 7 forms a boundary of a groove 9. The groove 9 is formed on an outer face 10 of the first plug housing section 3. In particular, this groove 9 is formed on an outer face 10 of the insertion portion 5. This groove 9 is axially bounded by the collar 7, on the one hand, and by a further radial bar 11, on the other hand. This radial bar 11 moreover bounds a further groove 12. This groove 12 is also formed on the outer face 10. The groove 12 moreover is axially bounded in the direction of the longitudinal axis A by a further radial bar 13. This radial bar 13 moreover is bounded by a further groove 14. This groove 14 is also formed on the outer face 10, in particular of the insertion portion 5. The grooves 9, 12, and 14, viewed in the direction of the longitudinal axis A, are thus immediately subsequent to each other and each separated from each other by a common radial bar 11, 13.

The electrical plug 1 in the embodiment shown in FIG. 1 comprises a friction brake device 15. This friction brake device 15 in the shown embodiment comprises a friction brake part 16 that is a component separate from the plug housing 2. The friction brake part 16 is configured to be formed as a single piece. In one embodiment, it is configured to be made from metal. In one embodiment, it is configured to be made from stainless steel. For instance this may be the stainless steel 1.4310. The friction brake part 16 in the shown embodiment is configured as friction brake ring section 17, which means that no circumferentially closed ring is realized. The friction brake ring section 17 extends in the circumferential direction around the longitudinal axis A and thus in the azimuthal direction only across an angle of between 300° and 355°. The friction brake ring section 17 is provided for being mounted in the groove 12 and is axially secured along a longitudinal axis A in the groove 12. The friction brake ring section 17 can also be referred to as tolerance ring. In this regard a corresponding tolerance compensation in the radial direction may be provided, which generates and maintains the friction brake functionality in a defined way.

In the embodiment shown in FIG. 1, the electrical plug 1 separate from the plug housing 2 comprises a securing ring section 18. The securing ring section 18 is formed as a single piece. It is a circumferentially non-closed ring. The securing ring section 18 is an integral part of an axial holding device 19. Thereby, the electrical plug 1 can be fixed in its axial position, viewed in the direction of the longitudinal axis A, in the plug socket. The securing in position at this axial level is thereby accomplished. The securing ring section 18 in one embodiment may be made from plastic. However, it may also be made from metal. The securing ring section 18 intentionally is provided for being mounted in the groove 9.

The axial holding device 19 is a device that is separate from the friction brake device 15. The axial holding device 19 is secured in position by this axial position. An axial shifting of the electrical plug 1 relative to the plug socket in the mounted state is then no longer possible. The friction brake device 15 in principle also already provides an axial retaining of the electrical plug 1 in the plug socket. However, it is not configured for fixing and securing a defined axial position of the electrical plug 1 in the plug socket. By a corresponding exertion of force the electrical plug 1 can be moved without the axial holding device 19 only with the friction brake device 15 in the axial direction of the plug socket. Even though this would a relatively large exertion of force, it would be possible. In order to avoid this, in one embodiment this axial holding device 19 is provided for fixing and securing in position.

In principle, however, also the electrical plug 1 could be configured without this axial holding device 19. Then the friction brake device 15 would be configured both for the friction brake functionality as well as for the axial holding. A double functionality would then be accomplished. In particular by the friction brake device 15 a defined axial holding force of larger than or equal to 5 Nm, in particular larger than or equal to 10 Nm, is configured in a defined way.

The securing ring section 18 in the mounted state in the groove 9, viewed in the radial direction, projects relative to the collar 7 and the radial bar 11. The securing ring section 18 is also configured to comprise a snap element 32. This means that it can snap into engagement behind a counter snap element on the housing part. By this snap-locked state, then the axial securing of the electrical plug 1 in position in the plug socket is achieved. By the design merely as a ring section and not as a fully circumferentially closed ring, also a radially elastic deformation of the securing ring section 18 is facilitated.

By the design of friction brake ring section 17, also an elastic deformation in the radial direction of the friction brake part 16 as a whole is facilitated. Upon press-fitting, the friction brake ring section 17 can be radially reduced. In an embodiment, the friction brake ring section 17 is configured to be radially elastically resilient. In particular this is formed by the non-closed ring geometry. This radial resilience is therefore to be viewed with regard to the friction brake ring section 17 as a whole.

The material as such of the friction brake ring section 17, however, is not configured to be elastically compressible. The wall thickness of the friction brake ring section 17 consequently is not elastically compressible. This means that the wall thickness dimensioned between the inner surface and the outer face, on which the unevenness described below is formed, is not elastically compressible. This applies to all azimuthal portions of the friction brake ring section 17. The friction brake ring section 17 is in particular not formed from an elastomer.

In the embodiment shown in FIG. 1, the electrical plug 1 comprises a seal or a sealing element 20, respectively. The sealing element 20 is a component that is separate from the plug housing 2, from the friction brake ring section 17, and from the securing ring section 18. The sealing element 20 is for instance a circumferentially closed ring. It may for instance be an O-ring. In particular this sealing element 20 is made from elastomer. The sealing element 20 is provided to be mounted in the groove 14.

The friction brake part 16 and thus the entire friction brake device 15 is not configured as sealing device. Due to such friction brake device 15 on a friction brake part 16 thus a sealing element 20 is not provided, which intentionally and primarily is provided for sealing the interface. The friction brake device 15 is not a thread or is threadless.

As can be discerned in FIG. 1, the friction brake part 16 in the mounted state on the outer face 10 is arranged to be radially exposed towards the outside. By the friction brake device 15, a friction braking acting in an azimuthally defined way around the longitudinal axis A with a defined preset torque threshold value is generated by a rotational movement of the electrical plug 1. This then is in particular the case if the electrical plug 1 with its insertion portion 5 is inserted into the plug socket and there is arranged in its end position. Only in case the defined threshold value is exceeded, then an intentionally envisaged rotational movement of the electrical plug 1 relative to the housing part is facilitated.

In one embodiment, by the friction brake device 15, a defined torque threshold value of between 1 Nm and 20 Nm is predefined. These threshold values may be predefined depending on a plug type of an electrical plug 1. Plug types can for instance be M12 plugs or M15 plugs or M17 plugs or M23 plugs or M40 plugs. In an embodiment, the torque threshold value in an M12 plug is predefined to be between 1 Nm and 4 Nm. In the case of an M15 plug the torque threshold value is predefined to be between 3 Nm and 8 Nm. In an M17 plug the torque threshold value is predefined to be between 4 Nm and 9 Nm. In the case of an M23 plug the torque threshold value is predefined to be between 3 Nm and 8 Nm. In the case of an M15 plug the torque threshold value is predefined to be between 8 Nm and 18 Nm. By the M value designations the thread dimensions of a coupling thread of a coupling portion of the electrical plug 1 are designated in millimeters. The coupling portion for instance is provided for coupling to another plug. In particular due to different weights of the plug types and/or due to different forces, which the plug types have to tolerate, the different torque intervals are advantageous. Thereby each plug type can be permanently used in a highly functional way.

As shown in FIG. 1, the friction brake ring section 17 comprises a radially inner surface 21. In an embodiment, the radially inner surface 21 is smooth. This surface 21 contacts the equally smooth bottom wall 12a of the groove 12, which acts as a contact surface of the first plug housing section 3. The bottom wall 12a via its height dimensioned in the direction of the longitudinal axis A is oriented in parallel to this longitudinal axis A. The height of the wall 12a is greater than 100% and less than 120%, for example 110%, of the height of the inner surface 21, viewed in the direction of this longitudinal axis A, this inner surface 21 is configured to be even. This means that it is rectilinearly oriented in a cross-section, in which the longitudinal axis A in its extension is fully contained, and is oriented in parallel to this longitudinal axis A. The inner surface 21 thus is not configured to be inwardly or outwardly curved. Viewed in the cross section, this contact surface 12a is configured to be rectilinear over its entire height. In particular also the inner surface 21 of the friction brake ring section 17, viewed in the cross section, is configured to be rectilinear over its entire height.

By such bearing of the friction brake ring section 17 on the outer face an undesired axial shifting upon pressing the first plug housing section 3 into the plug socket can be prevented. Since here, too, relatively large pressing forces are acting and the friction brake device 15 is of a defined configuration, the friction brake ring section 17 should be maintained in its axial position. The groove 12 mentioned in this regard facilitates this.

In another embodiment, the contact surface 12a and the inner surface 21 may also be oriented not in parallel to the longitudinal axis A, but in parallel to each other. Thereby a conical shape is produced.

An outer face 22 of this friction brake ring section 17 is configured to be uneven, as shown in FIG. 1. This means that in at least two different azimuthal positions, viewed around the longitudinal axis A, the outer face 22 has different radii. In particular this is the case in at least two defined and different azimuthal positions. In the embodiment shown in FIG. 1, in this regard, plural radial elevations 23 are formed on this outer face 22. These radial elevations 23 are configured to be separated and equidistant relative to each other in the circumferential direction around the longitudinal axis A. In the embodiment they are of a block-like design. In particular they may be formed in the shape of a truncated pyramid. In another embodiment, the radial elevations 23 could be rounded too. In this regard, these radial elevations 23 on their outer face have contact surfaces 24, by which a direct mechanical contact with a bounding wall of the plug socket is provided.

The friction brake part 16 projects furthest outward perpendicularly to the longitudinal axis A of the elements of the first plug housing section 3. This relates to the comparison of those components in the insertion portion, which are rigid in shape and/or not elastically deformable in themselves. By contrast, for instance an elastic seal in the unmounted state of the plug 1 may project further outward than the friction brake part 16.

By this uneven design of the outer face 22, viewed in the circumferential direction around the longitudinal axis A, in each case only one local mechanical contact of the friction brake ring section 17 with the bounding wall of the plug socket occurs. These elevations 23 may also be referred to as radial friction elements 25. These are configured for radial pressing on the bounding wall of the plug socket in such a way that the azimuthal friction brake function is generated.

In the mounted state of the friction brake ring section 17 in the groove 12, the friction brake ring section 17 is mounted to be rotatable, in particular endlessly rotatable, around the longitudinal axis A.

By the friction brake device 15, a defined torque threshold value of between 1 Nm and 20 Nm is predetermined. Upon exceeding this defined torque threshold value, the electrical plug 1 intentionally can be rotated around the longitudinal axis A on the housing part.

By this separate component and the endlessly rotatable mounting on the outer face, a particularly advantageous concept is realized. On the one hand, the pressing of the electrical plug 1 in the plug section is simplified. On the other hand, the manufacturing of the first plug housing section 3 is simpler if this friction brake ring section 17 is not integrated and needs to be manufactured integrally formed with it. This separated component design with the endlessly rotatable mounting of the friction brake ring section 17 on the outer face is particularly advantageous also for the desired rotational movement option of the electrical plug 1 relative to the plug socket. This is because, thus, the possibility is provided that upon mounting the electrical plug 1 on the plug socket the friction brake ring section 17 can be individually formed and this is also effected independently of the first plug housing section 3. This first plug housing section 3 should not deform during mounting on the plug socket. It is in this regard formed from a different material than the friction brake ring section 17. By this difference in material, the friction brake device 15 can be mechanically and functionally improved.

The second plug housing part 4 is provided for coupling for instance to another electrical plug, which is not shown here.

Figure 2:
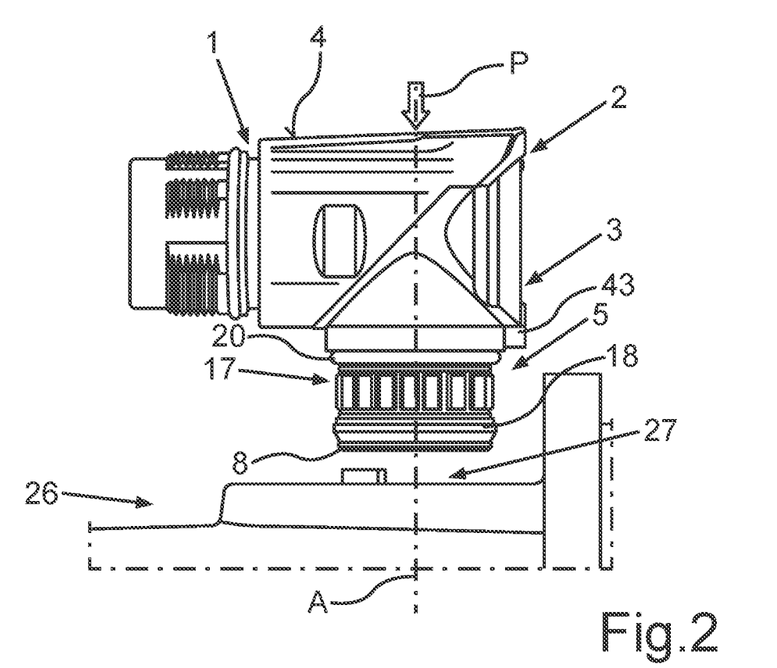
FIG. 2 is a side view of an arrangement according to an embodiment with the electrical plug of FIG. 1 in an assembled state and a partial portion of a housing part.

In FIG. 2, a side view of the electrical plug 1 according to FIG. 1 is shown in the assembled state. Respective positions of the securing ring section 18, of the friction brake ring section 17, and of the sealing element 20 can be discerned. Moreover, in FIG. 2, also a partial portion of a housing part 26 is exemplarily shown. This housing part 26 comprises a plug socket 27. This is in particular a bore or a round hole, respectively.

Figure 3:
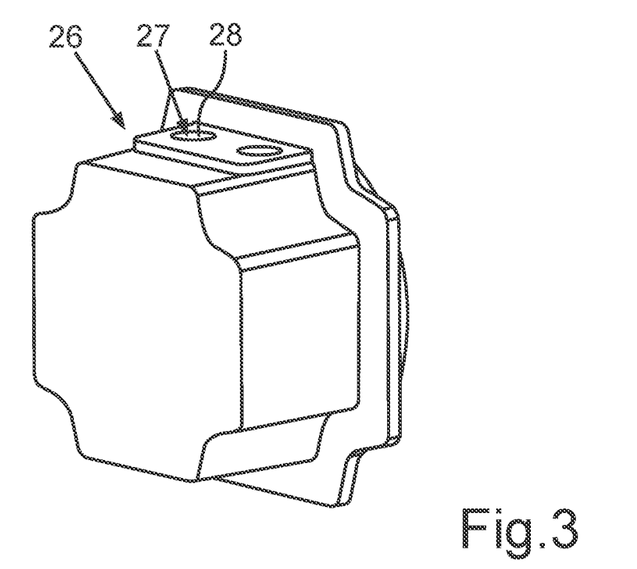
FIG. 3 is a perspective view of the housing part according to an embodiment.

In FIG. 3, in a perspective representation, an embodiment of a housing part 26 is shown. A plug socket 27 is equally discernible. A bounding wall 28 of this hole portion is configured to be particularly smooth.

Figure 4:
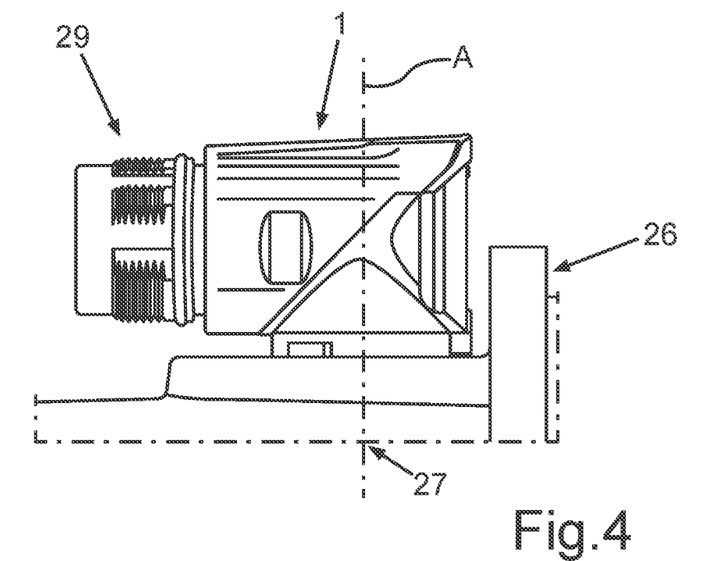
FIG. 4 is a side view of the arrangement of FIG. 2 with the electrical plug in the mounted final state in the housing part.

In FIG. 4, in a side view, an arrangement 29 is shown. The arrangement 29 in the embodiment comprises an electrical plug 1 according to the representations in FIG. 1 and FIG. 2. Here the mounted final state of the electrical plug 1 on the housing part 26 is shown. It can be discerned that the insertion portion 5 is inserted into the plug socket 27.

As is shown already in FIG. 1 and FIG. 2, the electrical plug 1 is shown with its coupling elements in FIG. 4. The electrical plug 1 in this connection also does not comprise any flange sleeve, as it is required in the initially mentioned prior art. In particular, the electrical plug 1 is conceived in such a way that it can be inserted into and retained in this plug socket 27 only by a plug connection. For this purpose, it is envisaged during mounting that the electrical plug 1 according to FIG. 2 is inserted linearly into this plug socket 27 along a mounting direction or assembling direction P. To this end, then the insertion portion 5 is pressed into this plug socket 27. Due to this axial insertion pressing force the azimuthal friction brake function is generated. This means that after the plug socket 27, to start with, is generated in the housing part 26 and the housing part 26 is provided, the electrical plug 1, which according to FIG. 2 is completely mounted, is provided and is inserted accordingly.

During this inserting, the friction brake ring section 17, on the one hand, is also radially compressed and in this regard also in particular plastically deformed and/or sheared off at the elevations 23. With the dimensioning of the friction brake ring section 17 during this axial insertion pressing also a radial pressing force of the friction brake ring section 17 on the bounding wall 28 is generated. By this radial pressing force, an azimuthal friction brake function is generated. In particular an outer face, in particular at least local portions of the outer face, of the friction brake part 16 is configured for plastic deformation during such compression in order to generate the radial pressing-into-contact force and thus generating the torque threshold value. In this regard, only the insertion along this linear assembling direction P is effected, which is oriented parallel or coaxially to the longitudinal axis A of the first plug housing section 3.

As already explained in the above, in the process of this assembling, also an automatic generating of this radial pressing force of the friction brake device 15 on the inner surface of the plug socket 27 is generated. This inner surface is the bounding wall 28. This is effected upon direct mechanical contacting of the friction brake ring section 17 with this inner surface or the bounding wall 28. Since this radially larger friction brake device 15 thus generates this radial pressing force on the bounding wall 28 in a defined way, thereby also automatically an effected defined generating of the desired azimuthal torque threshold value is configured. Thus, also intentionally the rotational movement possibility of the electrical plug 1 on the housing part 26 is formed. Thus, then an optional or situation-specific required rotating of the electrical plug 1 on the housing part 26 relative to the housing part 26 is facilitated.

The electrical plug 1 can be mounted in a specific way on a housing part of an electric motor. By this electrical plug 1 it is now facilitated that, on the one hand, a stable mechanical holding on the plug socket is achieved, and, on the other hand, an intended and desired rotational movement option of the electrical plug 1 relative to the housing part around the longitudinal axis A of the first plug housing section 3 is achieved, if the electrical plug 1 is already mounted on the housing part. Thus, the electrical plug 1 also in the mounted state can be oriented in different azimuthal rotational positions relative to the housing part. The electrical plug 1 thus is devised to the effect that it can be rotated in a defined way on the housing part as intended and desired. In order not to allow for a random rotational movement or possibly a rotational movement of the electrical plug occurring by itself, this friction brake device 15 is provided.

By the preset defined torque threshold value such rotational movement of the electrical plug 1 is facilitated only if a rotary force larger than the torque threshold value is exerted upon the electrical plug 1. Thus, not only a manifold and more variable use of the electrical plug 1 for mounting on such housing part is facilitated, but it is also achieved that here manifold rotational positions of the electrical plug 1 can be adjusted when it is already mounted on the housing part. The friction brake device 15 in one embodiment also prevents that even in the case of vibrations occurring during operation of the electric motor, which may act upon the electrical plug 1, no rotational movement of the electrical plug 1 around the longitudinal axis A of the first plug housing section 3 occurs by itself. Thus, the friction brake device 15 is generated in a very defined way in order to take into account the named aspects.

By the rotary movement possibility, it is then also achieved in the mounted state that a rotating of the first plug housing section 3 relative to this friction brake ring section 17 and thus also from the housing part is produced. Additionally or instead, it is also possible that the friction brake ring section 17, upon rotating of the electrical plug 1, is rotated along with it in the plug socket. The friction brake ring section 17 in this connection then also rotates relative to the plug section 3, if an azimuthal force is generated, which causes the exceeding of the preset defined torque threshold value.

In FIG. 4, moreover, also the end position of the electrical plug 1 in the plug socket 27 reached in the direction of the longitudinal axis A and thus in the axial direction is shown. In this axial end position, also an axial securing of this electrical plug 1 is provided. This is facilitated by the axial holding device 19 as explained.

The mounting of the electrical plug 1 on the housing part 26 thus is effected exclusively in the direction of the linear assembly direction P starting from the separated state according to FIG. 2 until the mounted final state is reached in FIG. 4. In this basic mounting process, thus no further other mounting movement is necessary. Starting from the mounted final state shown in FIG. 4 then optionally or situation-specifically a rotating of the electrical plug 1 around the longitudinal axis A can be effected. A desired rotation position can be adjusted individually.

Figure 5:
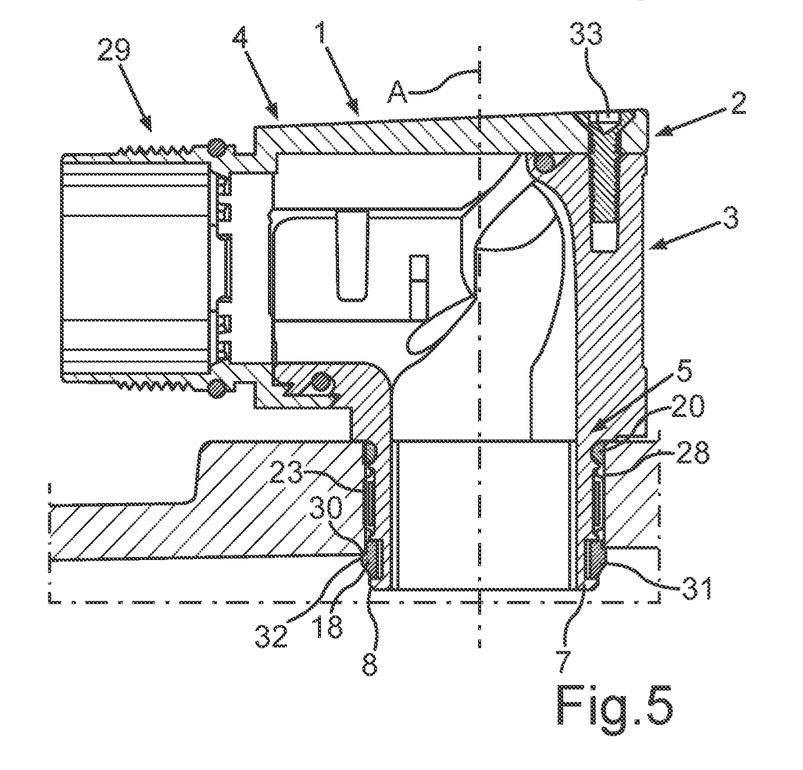
FIG. 5 is a sectional side view of the arrangement of FIG. 4.

In FIG. 5, a vertical sectional view of the arrangement 29 according to FIG. 4 is shown. Here it can be recognized how, on the one hand, the sealing element 20 contacts the bounding wall 28. Moreover, also the radial pressing of the friction brake ring section 17 on the bounding wall 28 can be recognized. In particular, here the surfaces or contact surfaces 24, respectively, are radially pressed on this bounding wall 28. Moreover, it can also be recognized that the securing ring section 18 has radially snapped into engagement behind a bottom edge 30 of the plug socket 27. As can also be recognized in FIG. 5, the securing ring section 18 comprises a conical outer wall section 31, as also shown in FIG. 1. By this inclined orientation, also the improved insertion into the plug socket 27 is facilitated. By the step formed in this outer wall section 31, a corresponding offset recess is formed in such a way that also the corresponding snap element 32 in this securing ring section 18 is integrally formed. By this snap element 32 the counter snap element (edge 30) of the plug recess 27 is radially snapped behind into engagement. Thus the securing of the electrical plug 1 in axial position is achieved.

In FIG. 5, it is also shown that the plug housing 2 in an advantageous embodiment is configured to consist of two parts. This means that the first plug housing section 3 and the second plug housing section 4 are separate components. They are here screwed together by a screw 33.

Figure 6:
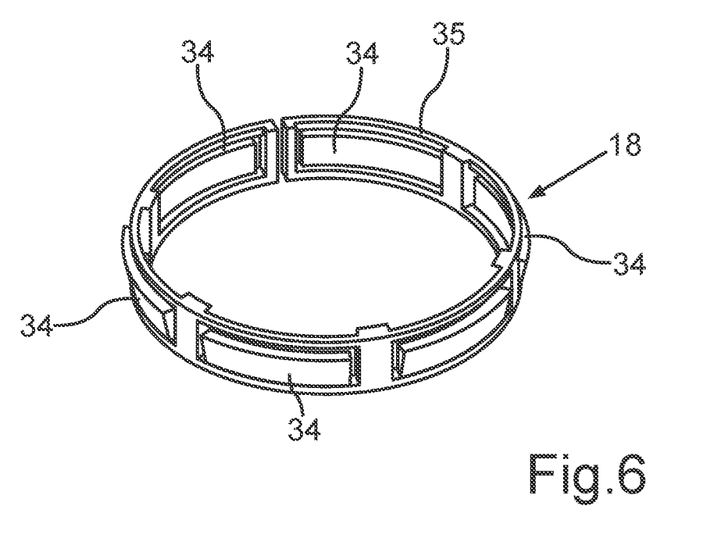
FIG. 6 is a perspective view of a securing ring section of an axial holding device according to an embodiment.

In FIG. 6, in a perspective view, a further embodiment of a securing ring section 18 is shown. In contrast to the embodiment according to FIG. 1, here the securing ring 18 is not realized with an uninterrupted design of a snap element 32. Rather, here individual azimuthal sections 34 are formed, which by their inclined position form the snap elements 32.

Figure 7:
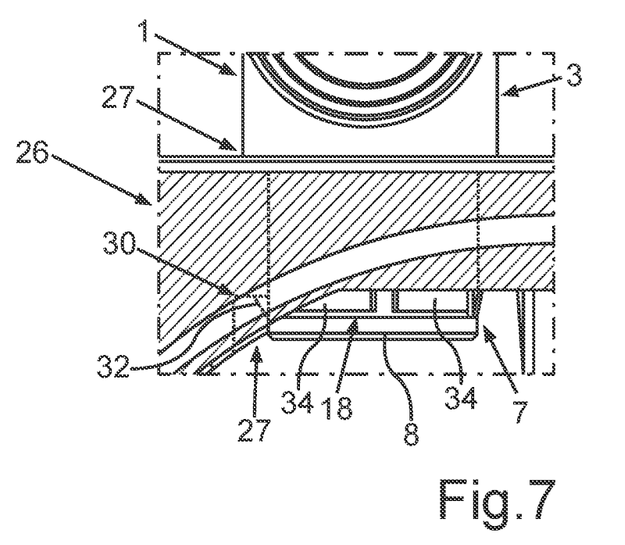
FIG. 7 is a detail sectional view of an arrangement according to another embodiment in which the securing ring section of FIG. 6 is mounted on the electrical plug.

In FIG. 7, a sectional view of a partial portion of an embodiment of an arrangement 29 is shown. Here the housing part 26 is shown, wherein in the plug socket 27 the electrical plug 1 is arranged already in its end position. In the embodiment shown here the electrical plug 1 comprises as securing ring section 18 the embodiment shown in FIG. 6. In FIG. 7, the snapped state of the snap element 32 in the counter snap element or the edge 30, respectively, is shown in dashed representation. Since in the sectional plane, this snapping basically could not be recognized, because one end of the housing part 26 projects, this snapped state is symbolized by dashed representation.

Figure 8:
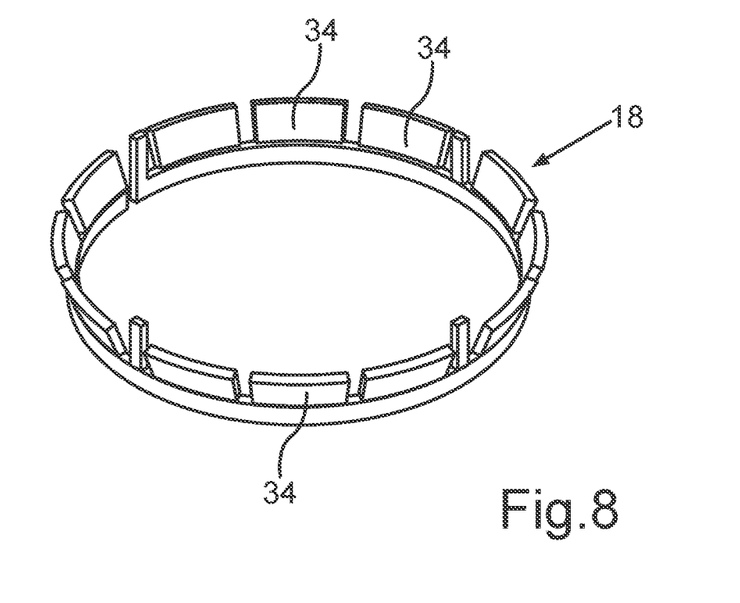
FIG. 8 is a perspective view of a securing ring section according to another embodiment.

In FIG. 8 a further embodiment for a securing ring section 18 is shown in a perspective representation. In this embodiment, a top connection bar 35, as it is shown in FIG. 6, is not present. Moreover, here the number of the elements 34 is greater than in FIG. 6.

Figure 9:
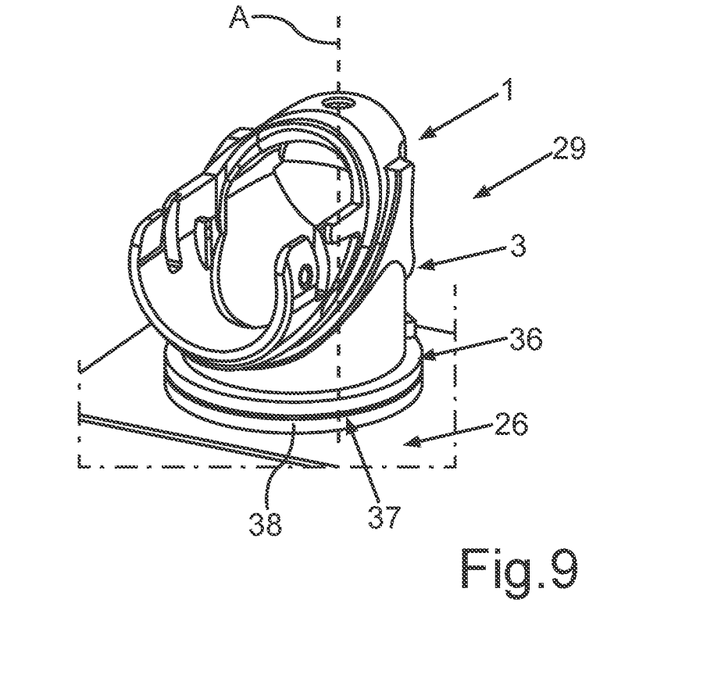
FIG. 9 is a perspective view of an arrangement according to another embodiment in which an axial holding device has a securing bracket.

In FIG. 9, a further embodiment of an arrangement 29 is shown. Here, already the mounted final state of the electrical plug 1 on the housing part 26 is shown. In this embodiment, the plug socket 27 has a collar 36 that extends upward. In this collar 36, an insertion slot 37 is formed. Into this insertion slot 37, a securing bracket 38 can be radially pushed. In FIG. 9, this securing bracket 38 is shown in the mounted final state. By this design, a further embodiment of an axial holding device 19 is realized. Instead of the securing ring section 18, here the securing bracket 38 is provided.

In the hitherto embodiments according to FIG. 1 to FIG. 8, the securing ring section 18 prior to mounting the electrical plug 1 in the plug socket 27 is already mounted on the first plug housing section 3. In the embodiment in FIG. 9 in contrast thereto, to start with, the electrical plug 1 is mounted in the plug socket 27 until it has reached its axial end position. Not until then, subsequently the securing bracket 38 is pushed into this insertion opening or the insertion slot 37. Only then the axial fixing of the electrical plug 1 in position in the housing part 26 is provided.

Figure 10:
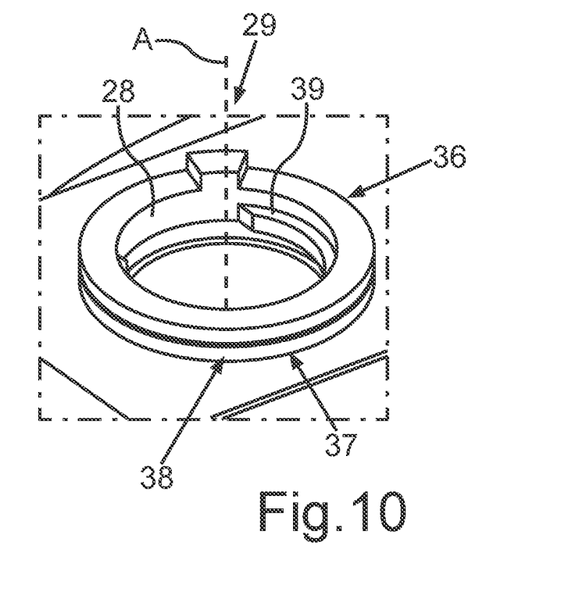
FIG. 10 is a detail perspective view of the arrangement of FIG. 9 without an electrical plug.

In FIG. 10, in this connection the arrangement 29 without the electrical plug 1 is shown. Here, it can be recognized that the securing bracket 38 relative to the bounding wall 28 radially projects inward, if it is arranged in the mounted final state. Therein, radially inwardly projecting sections 39 of this securing bracket 38 engage into engagement portions 40 (FIG. 12) of the first plug housing section 3. By this radial engagement, the axial securing in position is achieved.

Figure 11:
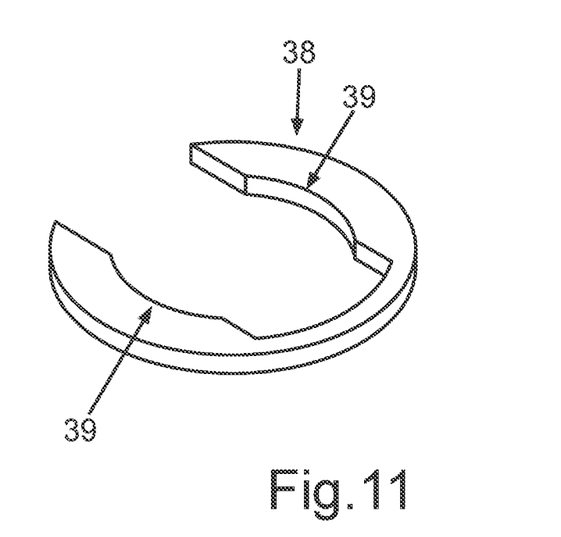
FIG. 11 is a perspective view of the securing bracket of FIG. 9.

In FIG. 11, an embodiment of the securing bracket 38 is shown in perspective representation.

Figure 12:
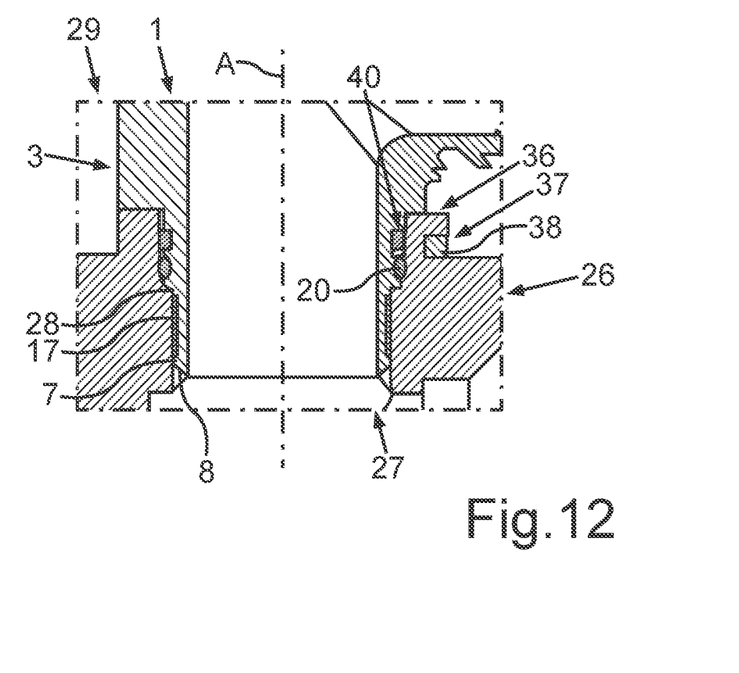
FIG. 12 is a detail sectional side view through a partial portion of the arrangement of FIG. 9.

In FIG. 12, in a vertical sectional view, the arrangement 29 according to FIG. 9 is shown. As can be discerned here, in this embodiment, the securing bracket 38 is arranged in axial direction after the sealing element 20. Thus, in comparison with the embodiments according to FIG. 1 to FIG. 8, the free end 6 is more distant than the sealing element 20 and the friction brake ring section 17.

Figure 13:
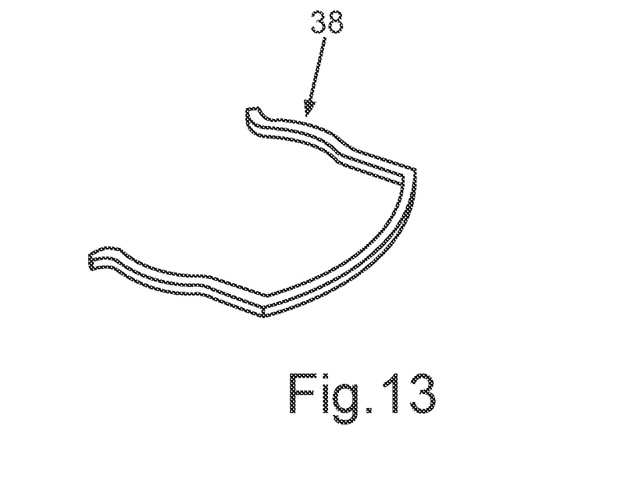
FIG. 13 is a perspective view of a securing bracket of an axial holding device according to another embodiment.

In FIG. 13, in a further embodiment, an alternative shape design of a securing bracket 38 is shown. This may be advantageously utilized in an arrangement 29 according to FIG. 10 or 12. In this embodiment, the elevation or the collar 36, respectively, is not formed as ring, but rather as square pedestal. The insertion slot 37 in this regard is not arranged on a curved outer wall, but rather on a rectilinear wall of this square geometry.

Figure 14:
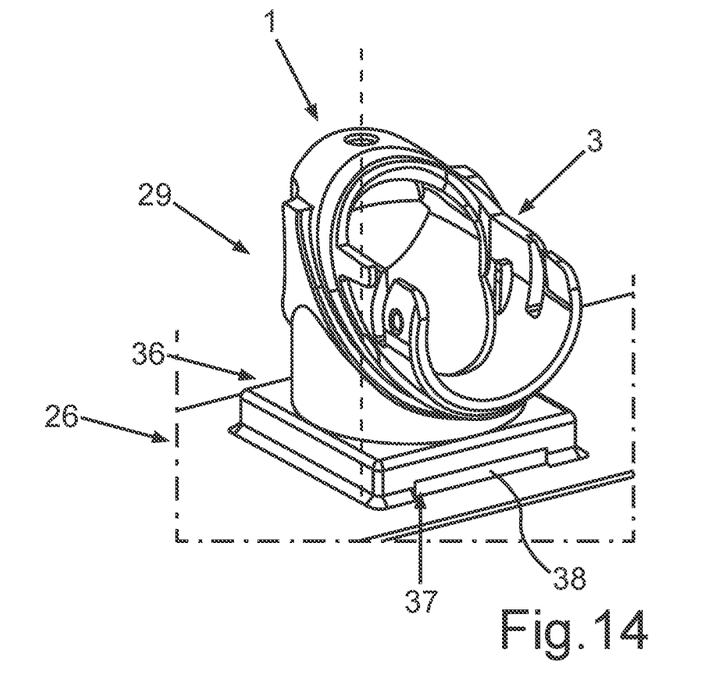
FIG. 14 is a perspective view of an arrangement according to an embodiment in which the securing bracket of FIG. 16 is mounted.
Figure 15:
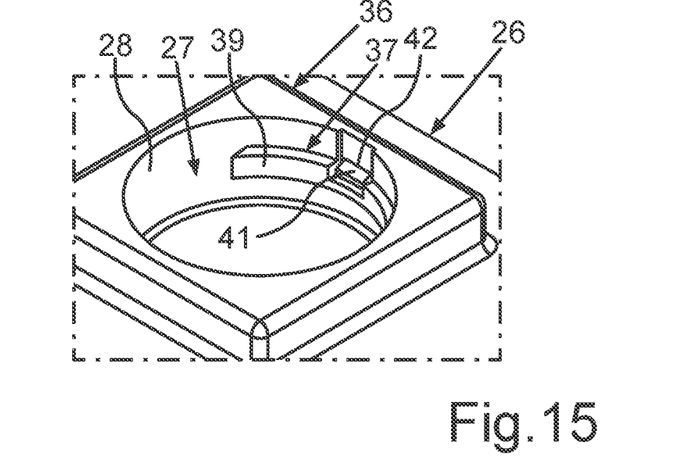
FIG. 15 is a detail perspective view of a housing part with a securing bracket of an axial holding device according to another embodiment.
Figure 16:
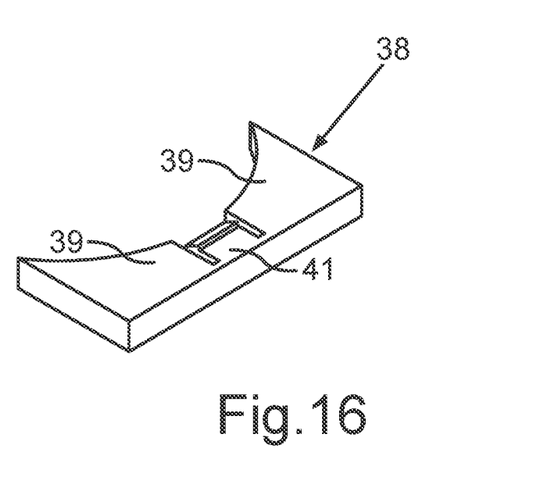
FIG. 16 is a perspective view of the securing bracket of FIG. 15.

In FIG. 15, a further embodiment in analogy to FIG. 10 is shown. Here the collar 36 according to the embodiment in FIG. 14 is realized. Via the insertion slot 37, here a further embodiment of a securing bracket 38 is inserted. In FIG. 16, the securing bracket 38 is shown in perspective representation.

Here, too, the securing bracket 38, as is also the case in FIG. 11 and FIG. 13, is formed as a single piece. It may be configured to be made from plastic or of metal. In the embodiment in FIG. 16, the securing bracket 38 comprises an integrated snap element 41. Same is configured for axial engagement with a counter snap element 42, as it is shown in FIG. 15. The counter snap element 42 in this regard is an outwardly oriented radial recess in the bounding wall 28.

Figure 17:
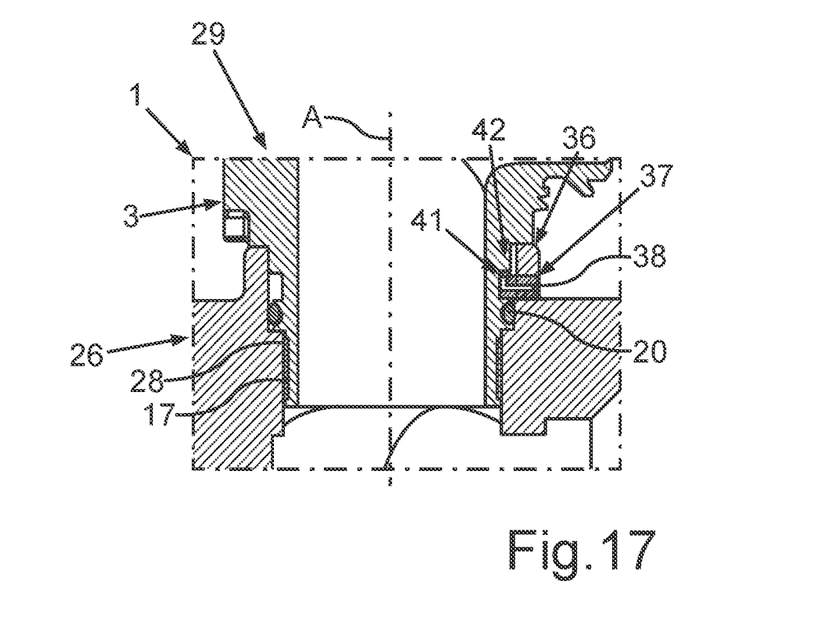
FIG. 17 is a detail sectional view through an arrangement including the housing part of FIG. 15 and the securing bracket of FIG. 16.

In FIG. 17, an embodiment of an arrangement 29 is shown in a vertical sectional view. This arrangement 29 comprises an electrical plug 1 as it has been explained for instance also in connection with FIG. 12 and FIG. 9 and FIG. 14. It thus in particular does not comprise a securing ring section 18. As can be recognized in FIG. 17, here the snapped state of the securing bracket 38 on the elevation or the collar 36, respectively, is shown. Thus, this securing bracket 38 cannot slip out from the insertion slot 37 in the radial direction. As can be seen in FIG. 15 and FIG. 16, the securing bracket 38 here, too, comprises radially inwardly projecting engagement portions 39, which are provided for engagement in the engagement portion 40 (FIG. 12). Thereby, too, then by this radial engagement an axial securing of the electrical plug 1 in position on the housing part 26 is achieved.

In particular, the electrical plug 1 on the plug housing 2 comprises a rotation stop device 43 (FIG. 2). By this rotation stop device 43, a rotation angle of the electrical plug 1 around the longitudinal axis A is limited. This also means that in particular in the mounted state of the electrical plug 1 by this rotation stop device 43 it is prevented that a rotation of an undesired rotation angle can be set. The rotation stop device 43 thus represents an end stop. In an embodiment, the rotation angle of the plug by this rotation stop device 43 is limited to a value smaller than 360°. In one embodiment by this rotation stop device 43 a rotation angle of between 310° and 340°, in particular of between 320° and 330°, is facilitated. It may be envisaged that starting from a mounting position between the electrical plug 1 and the housing part an angle of up to a maximum of 225° around the longitudinal axis A is facilitated and in the opposite direction around the longitudinal axis starting from this named basic state the rotation by a rotation angle of a maximum of 105° is facilitated.

In the embodiments above, the securing ring 18 is a circumferentially not closed ring. It is a ring section.

Figure 18:
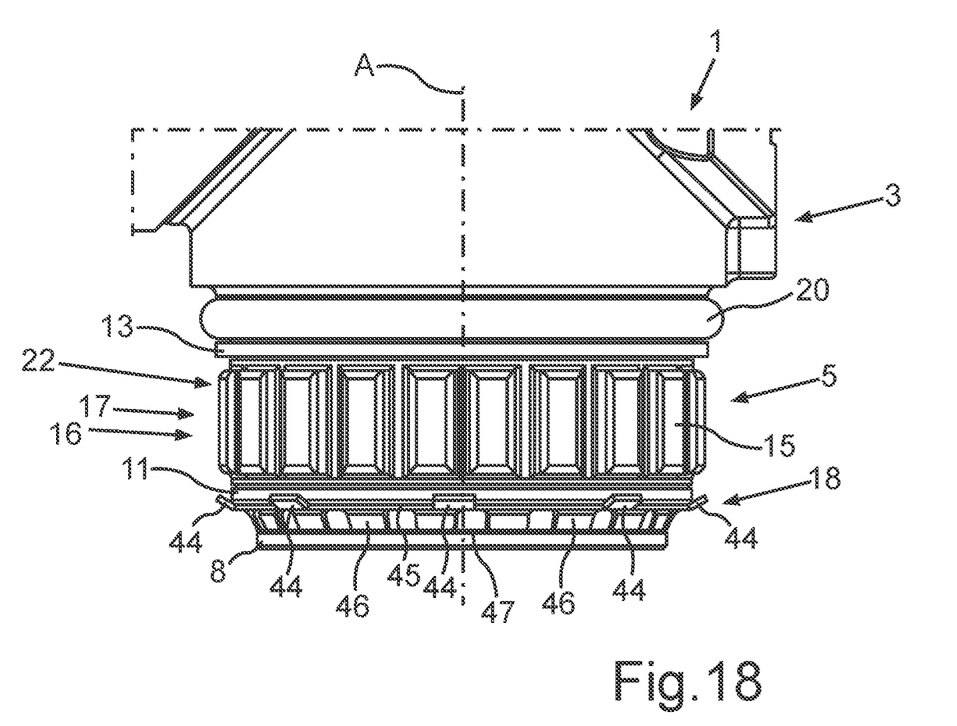
FIG. 18 is a detail side view of an electrical plug with a securing ring according to another embodiment.
Figure 19:
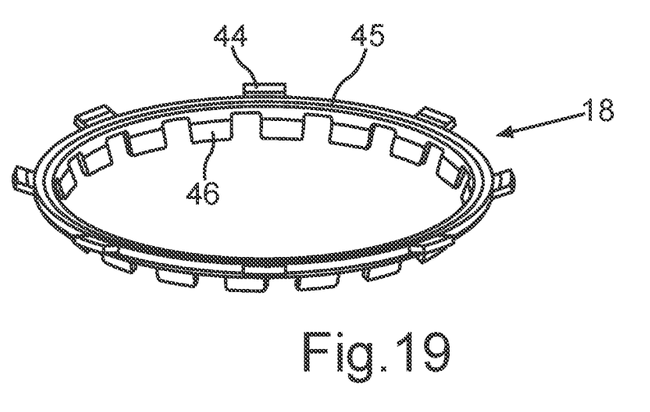
FIG. 19 is a perspective view of the securing ring of FIG. 18.
Figure 20:
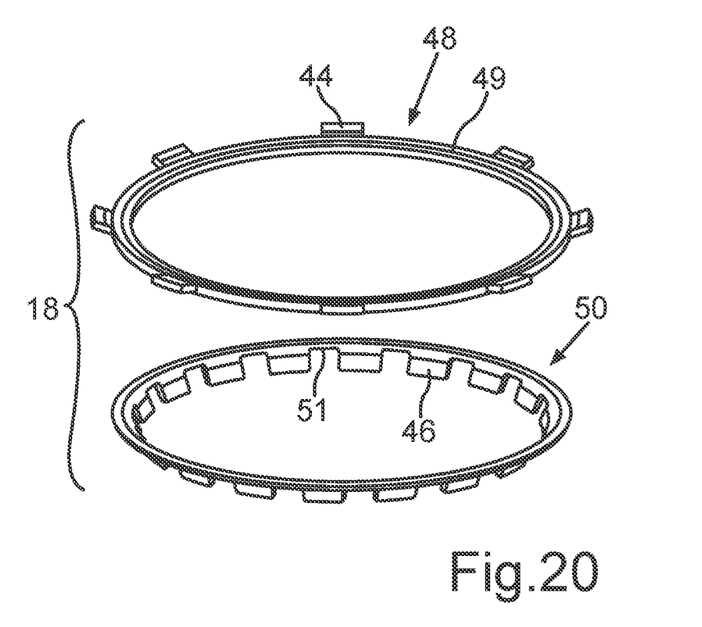
FIG. 20 is a perspective view of a securing ring according to another embodiment.

In an embodiment, this securing ring 18 is a circumferentially closed ring as it is shown in FIGS. 18, 19 and 20. In FIG. 18, the mounted state of the securing ring 18 on the first plug housing section 3 is shown. In an embodiment, the securing ring 18 comprises securing teeth 44, which are arranged on a closed base ring 45 of said securing ring 18. Said securing teeth 44 are arranged inclined to the horizontal plane and are orientated radially to the outside. So the securing teeth 44 crawls in the inner wall of the plug socket 27 when the mounted end position is installed. They can be named crawling teeth. By this, a force closure at the inner wall of the plug socket 27 and not only form closure is achieved.

Further, as shown in FIGS. 18, 19, and 20, the securing ring 18 comprises retaining teeth 46. The retaining teeth 46 are arranged on the base ring 45. The retaining teeth 46 are orientated to the other side from the base ring 45 in comparison to the crawling teeth 44 in the direction of the axis A of the first plug housing section 3. The retaining teeth 46 are retained axially on a bar 47 bounding the nut 9 configured on the first plug housing section 3. In an embodiment, the securing ring 18 is a single piece ring (FIG. 19). In a further embodiment (FIG. 20), the securing ring 18 comprises two separate rings. A first ring 48 comprises a closed base ring 49 and the integrated crawl teeth 44. A second ring 50 comprises a closed base ring 51 and the integrated retaining teeth 46. In the mounted state, the two base rings 49, 51 are arranged directly abutting each other.

A further aspect of the invention relates to a method for mounting the electrical plug 1. This electrical plug 1 is mounted on a housing part of a housing for an electric motor. In this process the following steps are performed:

manufacturing a plug socket 27 in the housing part for receiving a first plug housing section 3 of the electrical plug 1;

attaching a friction brake part 16 to the outer face of the first plug housing section 3 for generating a friction brake device 15 on the outer face of the first plug housing section 3, inserting the first plug housing section 3 with the friction brake device 15 into the plug socket, in particular only along a linear assembling direction, which is oriented parallel or coaxially to the longitudinal axis of the first plug housing section 3;

automatic generating of a radial pressing force of the friction brake device 15 on the inner surface of the plug socket whilst directly contacting the inner surface by the, in comparison with the inner dimension of the plug socket, radially larger friction brake part and thereby caused defined generating of a torque threshold value for rotating the electrical plug 1 relative to the housing part in the mounted final state of the electrical plug 1 on the housing part;

reaching an axial end position of the first plug housing section 3 in the plug socket;

securing the axial end position, reached, in particular only by an axial insertion, by an axial holding device 19 of the arrangement.

The axial holding device 19 may be formed by the friction brake device 15 itself or by an axial holding device 19 that is separate therefrom.

Advantageous embodiments of the plug and/or the arrangement are to be regarded as advantageous embodiments of the method, wherein for this purpose the individual components of the plug and/or the arrangement alone or in at least partial operative connection facilitate the method steps during mounting as well as during possibly following rotating of the plug relative to housing part.

What is claimed is:

1. An electrical plug, comprising:
 a plug housing having a first plug housing section with a longitudinal axis; and
 a friction brake device including a friction brake part arranged on an outer face of the first plug housing section, the friction brake part is exposed towards an area outside the electrical plug in a radial direction to the longitudinal axis, the friction brake device provides a friction braking azimuthally around the longitudinal axis below a set torque threshold value for the electrical plug, the friction brake device has a friction brake ring section as the friction brake part, the friction brake ring section is separate from the first plug housing section, the friction brake ring section is mounted to be rotatable on the outer face of the first plug housing section, the friction brake ring section has an uneven outer face with different radii in at least two different azimuthal positions, the uneven outer face of the friction brake ring section has a plurality of radial friction elements radially pressing on a plug socket of a housing part in which the first plug housing is insertable.

2. The electrical plug of claim 1, wherein the friction brake device is capable of directly mechanically contacting the plug socket.

3. The electrical plug of claim 1, wherein the outer face of the first plug housing section has a groove in which the friction brake ring section is arranged and in which the friction brake ring section is axially secured along the longitudinal axis.

4. The electrical plug of claim 1, wherein the friction brake ring section extends across an angle of between 300° and 355° around the longitudinal axis.

5. The electrical plug of claim 1, wherein the radial friction elements generate the friction braking when pressed against the plug socket.

6. The electrical plug of claim 1, wherein the friction brake ring section is formed in a single piece and/or is formed of metal.

7. The electrical plug of claim 1, wherein the set torque threshold value is between 1 Nm and 20 Nm.

8. The electrical plug of claim 1, wherein the plug housing has a rotation stop device by which a rotation angle of the electrical plug around the longitudinal axis is limited.

9. The electrical plug of claim 1, further comprising an axial holding device fixing an axial position of the first plug housing to the housing part along the longitudinal axis.

10. The electrical plug of claim 9, wherein the axial holding device is a securing ring section arranged in a groove on the outer face of the first plug housing section and projecting radially beyond the outer face of the first plug housing section.

11. The electrical plug of claim 10, wherein the securing ring has a plurality of crawl teeth and a plurality of retaining teeth or the securing ring has an integrated snap element.

12. The electrical plug of claim 1, further comprising a seal separate from the friction brake device and arranged on the outer face of the first plug housing section.

13. An electrical plug, comprising:
a plug housing having a first plug housing section with a longitudinal axis; and
a friction brake device including a friction brake part arranged on an outer face of the first plug housing section, the friction brake part is exposed towards an area outside the electrical plug in a radial direction to the longitudinal axis, the friction brake device provides a friction braking azimuthally around the longitudinal axis below a set torque threshold value for the electrical plug, the friction brake device has a friction brake ring section as the friction brake part, the friction brake ring section is separate from the first plug housing section, the friction brake ring section is mounted to be rotatable on the outer face of the first plug housing section, the friction brake ring section extends across an angle of between 300° and 355° around the longitudinal axis.

14. An electrical plug, comprising:
a plug housing having a first plug housing section with a longitudinal axis;
a friction brake device including a friction brake part arranged on an outer face of the first plug housing section, the friction brake part is exposed towards an area outside the electrical plug in a radial direction to the longitudinal axis, the friction brake device provides a friction braking azimuthally around the longitudinal axis below a set torque threshold value for the electrical plug, the first plug housing section is insertable into a plug socket of a housing part; and
an axial holding device fixing an axial position of the first plug housing to the housing part along the longitudinal axis.

15. The electrical plug of claim 14, wherein the axial holding device is a securing ring section arranged in a groove on the outer face of the first plug housing section and projecting radially beyond the outer face of the first plug housing section.

16. The electrical plug of claim 15, wherein the securing ring has a plurality of crawl teeth and a plurality of retaining teeth or the securing ring has an integrated snap element.

* * * * *